March 8, 1932. E. H. CORLETT ET AL 1,848,871
MEANS FOR DISSIPATION OF STATIC ELECTRICITY IN FILM CAMERAS
Filed Jan. 2, 1931
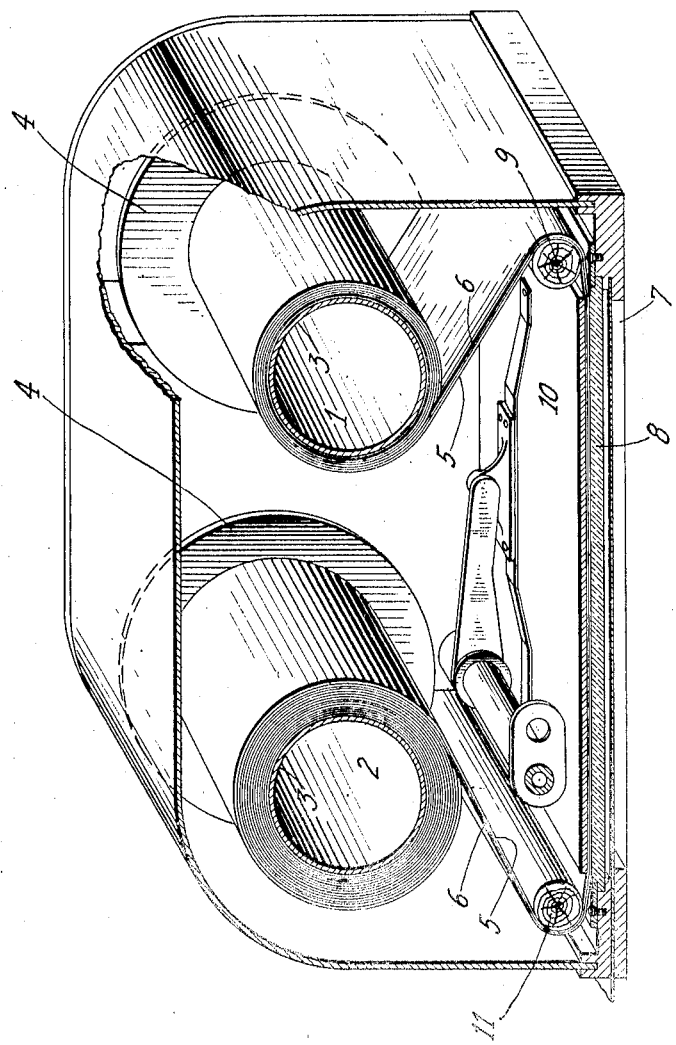

Patented Mar. 8, 1932

1,848,871

UNITED STATES PATENT OFFICE

EDWIN H. CORLETT, OF LEWISBORO, AND GEORGE M. SMITH, JR., OF BROOKLYN, NEW YORK, ASSIGNORS TO FAIRCHILD AERIAL SURVEYS, INC., OF NEW YORK, N. Y., A CORPORATION OF NEW YORK

MEANS FOR DISSIPATION OF STATIC ELECTRICITY IN FILM CAMERAS

Application filed January 2, 1931. Serial No. 506,180.

This invention has for its object the elimination of static electricity attending the advancement of film in a camera.

A further object of the invention is to effect such elimination without any special complicated or expensive treatment of the film and without any change in or addition to the camera design, but on the contrary to render each wound film spool inherently capable of static discharge as it is placed in the camera.

To this end it is proposed to place a thin ribbon or sheet of metallic electricity conducting material, such as tin foil or the like, on the back of the entire area of film and to roll the metallic ribbon and the film on the spool so that the tin foil and the film will be alternate layers, and to provide a suitable grounding means from the metal ribbon to the metallic body of the camera.

With the foregoing and other objects in view, the invention consists in the combination of parts and in the details of construction hereinafter set forth in the specification and appended claims, certain embodiments thereof being illustrated in the accompanying drawings, in which the figure represents a view in perspective of a portion of an aerial camera showing the film spools in the magazine, film wound on the spools, and the arrangement of the static eliminating medium.

Referring more particularly to the drawing, both film spools comprise hollow barrels 3 and circular end flanges 4 which may tend to retain the edges of the film in alignment as it is rolled onto the spool. The spool 1 is shown as the one carrying the unexposed film while spool 2 is the one upon which the film is being wound after exposure has been made.

Prior to the insertion of the spool 1 into the camera magazine a long thin sheet or ribbon of metallic material 5, such as tin foil or the like, is placed flat on a strip of film 6 of the same length, and the film and tin foil are wound onto the spool so as to form alternate layers thereon. Any suitable means may be provided for establishing a ground from the metal ribbon to the metallic body of the camera.

Any static electricity produced by friction incident to rotation of the spools occurring during the unwinding of the film from spool 1 and the winding of the film onto spool 2 is grounded through the tin foil through a suitable medium to the metallic body of the camera.

The exposure area of the camera is indicated at 7 over which is arranged a glass plate 8. The film and tin foil upon removal from spool 1 pass around a roll 9 and across the upper face of the glass plate, the tin foil during its passage over the plate forming a top layer for the film; thus not interfering with the exposure thereof. A metallic pressure plate 10, with its operating mechanism controlled by the film feeding mechanism, presses the film and tin foil flat on the glass plate during the exposure interval. The operation and control of the pressure plate is more fully described in the United States patent to Sherman M. Fairchild, No. 1,612,860, filed January 4, 1927. The film and foil, after exposure of the film, pass around the roll 11 and are wound up on the spool 2.

The tin foil thus acts as a medium through which is discharged any static electricity attending any movement of the film during its entire travel from the spool 1 to the spool 2, and a grounding medium from the metal ribbon may be provided by having the face of the pressure plate metallic so that through its contact with the metal ribbon the static electricity will be discharged from the metal ribbon through the pressure plate and thence through the metallic body of the camera. Another means of obtaining this grounding medium is to provide a film roll in the form of a ground attached to the body of the camera provided with a roll which rests upon the metal ribbon wound on the spool. This expedient may be provided for either one or both of the film spools. Still another means for obtaining a ground medium is to arrange for either one or both of the edges of the metal ribbon to contact with the end flanges of a spool, these end flanges being metallic in this case and the suspension devices for the film spool or spools to constitute an electrical conducting medium between the metallic camera body and the metallic end flanges of the spools. A still further and preferred means of providing a ground for the static electricity is to use a spool, the core of which is an electrical conductor and to so wind the film and metal ribbon that the metal ribbon will be connected at its one end to the core, thus providing for conduction to the core and thence to the metallic spool suspension devices within the magazine so as to ground any static electricity formed by the film through the camera body.

It will be realized from the foregoing that there is hereby effected an efficient and effective manner of dissipating static electricity so readily occurring from friction of film which by reason of its high combustibility renders an occurrence of static electricity in a camera a highly dangerous thing.

It will be further seen that such a static electricity dissipator inherent within the film wound spool has been provided without a complicated and expensive treatment of the film for that purpose, and without any modification of the spool upon which it is wound or any modification of camera magazine design.

Having thus described our invention, we claim:

1. In a roll of photographic film, a means for dissipating static electricity, consisting of an interposed electric conducting medium separate from and of approximately the width of the image band of said film and so placed as to be spirally concentric and in contact with said image band.

2. In a camera, a means for dissipating static electricity resulting from friction of photographic film comprising in combination a film spool, separate sheets of photosensitive film and metallic material wound on said barrel in alternate layers and a suitable electric grounding medium between said metallic sheet and the body of said camera.

3. In a camera employing a plurality of film spools, means for dissipating static electricity resulting from friction of the film in its movements within said camera, said means comprising the combination of and arrangement of spools with magazine elements for engaging said spools to suspend the latter, separate adjacent sheets of photographic film and metallic material wound on one of said spools and adapted to be fed to the other spool during the operation of the camera, and a grounding medium for static electricity from said film through said metallic sheet and through the camera body.

4. In a roll of photographic film, a means for dissipating static electricity consisting of a separate layer of tin foil of approximately the width of the image band of said film and so loosely interposed as to be spirally concentric and in contact with said image band.

5. In a camera employing a plurality of film spools, means for dissipating static electricity resulting from friction of the film in its movements within said camera, said means comprising the combination of an arrangement of spools with magazine elements for engaging said spools to suspend the latter, separate adjacent sheets of photographic film and tin foil wound on one of said spools and adapted to be fed to the other spool during the operation of the camera, and a grounding medium for static electricity from said film through said tin foil and through the camera body.

In testimony whereof, we hereto affix our signatures this 27th day of December, 1930.

EDWIN H. CORLETT.
GEORGE M. SMITH, Jr.